United States Patent
Jordan

(10) Patent No.: US 7,478,815 B2
(45) Date of Patent: Jan. 20, 2009

(54) HIGH-PRESSURE SEALING ASSEMBLY

(75) Inventor: Holger Jordan, Neuhausen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 20 days.

(21) Appl. No.: 10/489,937

(22) PCT Filed: Sep. 13, 2002

(86) PCT No.: PCT/DE02/03400

§ 371 (c)(1),
(2), (4) Date: Aug. 6, 2004

(87) PCT Pub. No.: WO03/027545

PCT Pub. Date: Apr. 3, 2003

(65) Prior Publication Data

US 2004/0251636 A1 Dec. 16, 2004

(30) Foreign Application Priority Data

Sep. 18, 2001 (DE) ................................. 101 45 914

(51) Int. Cl.
*F16J 15/32* (2006.01)
*F16J 15/00* (2006.01)
(52) U.S. Cl. ........................ 277/551; 277/560; 277/578; 277/589
(58) Field of Classification Search ................. 277/551, 277/556, 560, 578–581, 589, 585
See application file for complete search history.

(56) References Cited

U.S. PATENT DOCUMENTS

| | | | | |
|---|---|---|---|---|
| 3,268,235 A | * | 8/1966 | Jacobellis | 277/468 |
| 3,663,024 A | | 5/1972 | Traub | |
| 3,771,801 A | * | 11/1973 | Burke | 277/584 |
| 3,814,445 A | * | 6/1974 | Bitzan | 277/589 |
| 4,917,390 A | * | 4/1990 | Lee et al. | 277/589 |
| 5,433,452 A | * | 7/1995 | Edlund et al. | 277/589 |

(Continued)

FOREIGN PATENT DOCUMENTS

DE  41 40 833 A1  11/1992

(Continued)

*Primary Examiner*—Vishal Patel
(74) *Attorney, Agent, or Firm*—Walter A. Hackler

(57) ABSTRACT

A high-pressure sealing arrangement is provided for sealing a gap (26) between two concentric machine parts (4, 5) which can be moved relative to each other, of which a first machine part (4) comprises a groove (3) and a second machine part (5) comprises an outer peripheral surface (7) opposite the groove (3). A sealing ring (1) of an extrusion-resistant material and a tensioning ring (2) of an elastomeric material are provided in the groove (3). A shaped section of the sealing ring (1) on the low-pressure side can be deflected towards the outer peripheral surface (7) under fluid pressure load. When the pressure decreases, the pressure-dependent deflection of the sealing ring (1) automatically returns towards the initial, unpressurized state of the sealing ring (1). The sealing ring (1), viewed in cross-section and in the unpressurized state, has a shaped sealing ring surface (6) facing the outer peripheral surface (7), which merges at least with respect to the shaped section on the low-pressure side, into a shoulder surface (13) separated from the outer peripheral surface (7) at a first separation $d_1$, which merges into a shoulder surface (13) side surface (20) with a second, larger separation $d_2$ from the outer peripheral surface (7).

1 Claim, 1 Drawing Sheet

U.S. PATENT DOCUMENTS 6,450,502 B1 * 9/2002 Baehl et al. .................. 277/387

FOREIGN PATENT DOCUMENTS

| | | |
|---|---|---|
| DE | 199 53 925 A1 | 5/2000 |
| DE | 199 07 883 A1 | 8/2000 |
| GB | 2 349 925 A | 11/2000 |
| WO | WO 00/50788 | 8/2000 |

* cited by examiner

HIGH-PRESSURE SEALING ASSEMBLY

The invention relates to a high-pressure sealing arrangement for sealing the gap between two concentric machine parts which can be moved relative to each other, of which a first machine part comprises a groove and the second machine part comprises an outer peripheral surface opposite to the groove.

PRIOR ART

A high-pressure sealing arrangement of this type is disclosed e.g. in DE 43 23 266 A1.

In the conventional arrangement for sealing the gap between two concentric machine parts which can be moved relative to each other, the groove has a sealing ring which is stationarily mounted in the machine element. The sealing ring is flexible with respect to radial and axial forces acting on the sealing ring. The pressure-dependent deformation of the sealing ring is reversible, i.e. when the fluid pressure on the high-pressure side drops, the sealing ring automatically assumes its initial shape. The sealing surface or sealing edge can be pressure-relieved.

OBJECT OF THE INVENTION

It is the underlying purpose of the invention to further develop the conventional sealing arrangement to further improve the frictional and extrusion behavior in the region of dynamic sealing.

SUBJECT MATTER AND ADVANTAGES OF THE INVENTION

This object is achieved with a high-pressure sealing arrangement, wherein the groove has a sealing ring of an extrusion-resistant material and a tensioning ring of an elastomeric material, wherein, under fluid load, a shaped section of the sealing ring on the low-pressure side can be deflected towards the outer peripheral surface, wherein the pressure-dependent deflection of the sealing ring automatically returns towards the initial unpressurized state of the sealing ring when the pressure is reduced, wherein the sealing ring, viewed in cross-section and in the unpressurized state, has a shaped sealing ring surface facing the outer peripheral surface, which merges, at least with respect to the shaped region on the low-pressure side, into a shoulder surface which is separated from the outer peripheral surface at a first separation $d_1$, which merges into a shoulder surface side surface with a larger, second separation $d_2$, from the outer peripheral surface.

The shape of the sealing ring surface may be indented, wavy or stepped. The sealing ring surface has a support foot or a support section with the pre-tensioned sealing surface. This provides sealing at low fluid pressures. At higher pressure loads, the support foot or support section tilts and the sealing surface is pressure-relieved, an edge, step or projection having an edged or round shape on the shoulder surface on the low-pressure side, is placed thereon and becomes a sealing edge or sealing surface. In this fashion, the pressure relief of the sealing ring elements abutting the outer peripheral surface of the second machine part is improved. The sealing ring is produced from a material which is harder than that of the tensioning ring and has a higher modulus of elasticity. The core of the invention is the selection of the materials and of the multi-stage sealing ring surface in the region of the outer peripheral surface of the second machine part. This multi-stage sealing ring surface may be placed on the outer peripheral surface after pivoting of the sealing ring. Friction produced by rotation and translation of the second machine part is reduced.

The sealing ring is preferably symmetrical. When the pressure is reduced, the pressure-dependent deflection of the sealing ring automatically returns towards the initial state of the sealing ring in the unpressurized state, wherein the sealing ring—viewed in cross-section and in the unpressurized state—has a shaped sealing ring surface which faces the outer peripheral surface and merges on both sides in steps into two shoulder surfaces which are separated from the outer peripheral surface and merge into side surfaces via at least one edge.

In a further development of the invention, the shoulder surfaces merge into the side surfaces via inclined surfaces which extend transversely to the outer peripheral surface. One gap each is formed towards the high-pressure side and towards the low-pressure side. Fluid may get below the inclined surface on the high-pressure side when pressure is exerted which supports pivoting of the sealing ring.

The inventive high-pressure sealing arrangement can be used for rotary transmission in hydraulics.

DRAWING

The schematic drawing shows one embodiment of the inventive sealing arrangement which is explained in the following description. The objects shown in the individual figures and sections of the sealing arrangement are partially greatly enlarged and the distortion is exaggerated to show the function of the sealing arrangement more clearly.

DESCRIPTION OF THE EMBODIMENT

Figure 1:
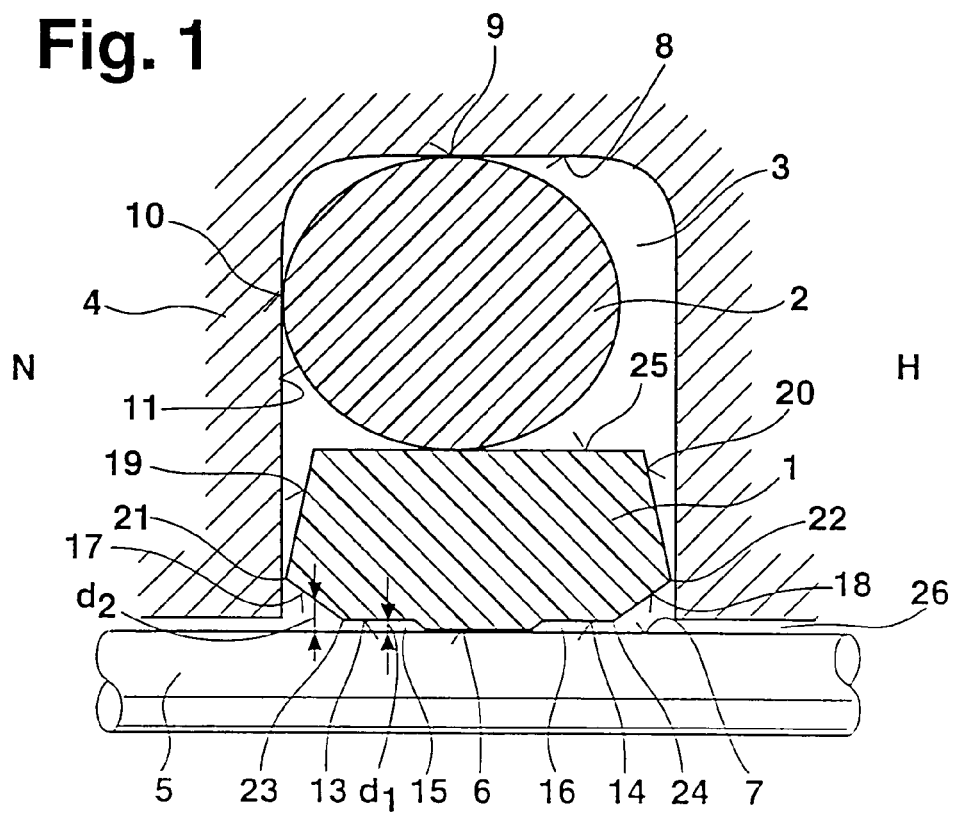
FIG. 1 shows a cross-section of a sealing arrangement without or with little pressure load.

FIG. 1 shows a sealing ring 1 made from an extrusion-resistant rigid material such as polyurethane or similar materials, and a tensioning ring 2 from an elastomeric material. The sealing ring 1 and the tensioning ring 2 are installed in a groove 3 of a first machine part 4 which is disposed opposite to a rotatable second machine part 5. The sealing ring 1 and the tensioning ring 2 together are larger than the groove 3. Through introduction of the sealing ring 1 and tensioning ring 2 into the groove 3, a sealing surface 6 of a support foot or support section is pressed to an outer peripheral surface 7 of the second machine part 5 to permit reduction of the interference in the static sealing region. In the installed state, shown in FIG. 1, the tensioning ring 2 is pre-tensioned on the groove bottom 8 and abuts the groove bottom 8 and a groove flank 11 on the low-pressure side through contact lines 9 and 10. The contact lines 9 and 10 have the function of statically active sealing edges.

In FIG. 1, H designates the high-pressure side and N designates the low-pressure side. In FIG. 1, the sealing ring is loaded with a low fluid pressure. The sealing ring 1 has a substantially trapezoidal cross-sectional shape, wherein the sealing ring side facing the outer peripheral surface 7 has several shapes. A central sealing surface 6 associated with a dynamic sealing region merges on both sides in steps into two shoulder surfaces 13 and 14 which are separated from the outer peripheral surface 7 to form spaces 15 and 16. The shoulder surfaces 13 and 14 are each connected to side surfaces 19 and 20 of the sealing ring via inclined surfaces 17 and 18 which extend transversely to the outer peripheral surface 7.

The inclined surfaces 17 and 18 intersect the side surfaces 19 and 20 at edges 21 and 22. The shoulder surfaces 13 and 14 intersect the inclined surfaces 17 and 18 at edges 23 and 24. The rear side 25 of the sealing ring 1 abuts the tensioning ring 2. The sealing ring 1 seals a gap 26 between the machine parts 4 and 5. Relevant for the invention are two different separations $d_1$ and $d_2$, wherein the latter is not constant in the present case due to the inclined surface. If formed like a step, $d_2$ would e.g. also be constant.

Figure 2:
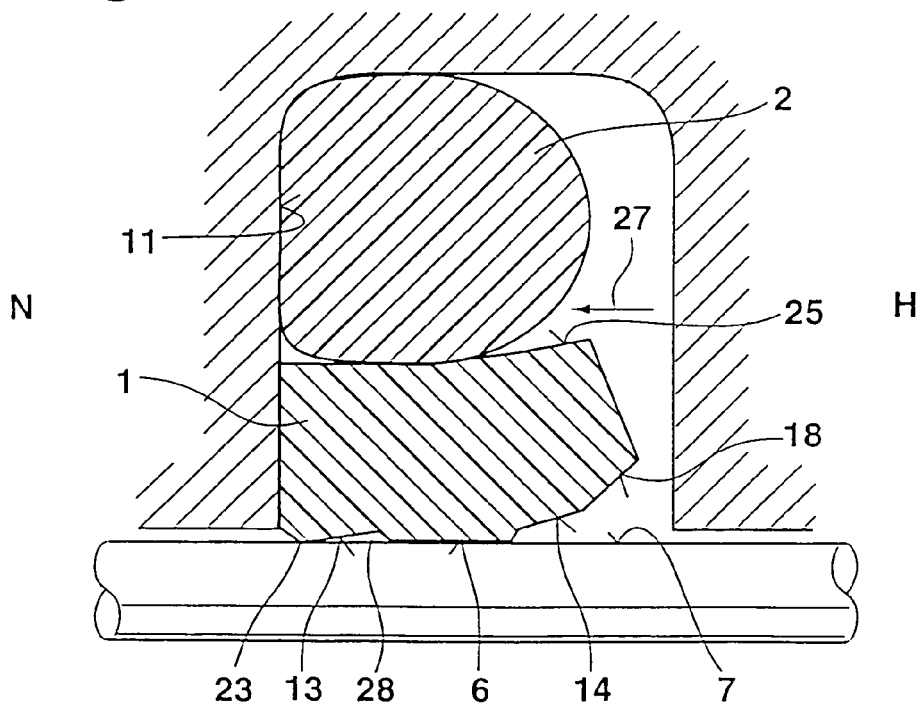
FIG. 2 shows the sealing arrangement of FIG. 1 under high pressure load.

FIG. 2 shows the sealing ring 1 which is pressurized from the high-pressure side H. The sealing ring 1 is loaded in the direction of arrow 27 with pressure P. The sealing ring 1 is pressed to the groove flank 11 via the fluid pressure P. Due to the shape of the sealing ring 1, the sealing ring 1 is pivoted towards the low-pressure side N such that the edge 23 is pressed to the outer peripheral surface 7. The edge 23, the shoulder surface 13 and the central sealing surface 6 form a closed annular space 28. The edge 23 and the partially pressure-relieved sealing surface 6 assume the function of a dynamic sealing. The sealing ring 1 abuts the outer peripheral surface 7 flatly via the sealing surface 6 and linearly via the edge 23. The sealing ring 1 and the tensioning ring 2 are compressed on the groove flank 11 on the low-pressure side and abut planarly. The inclined surface 18 is lifted by the fluid pressure P. The rear side 25 is curved towards the tensioning ring 2. The distance between shoulder surface 14 and outer peripheral surface 7 increases. The fluid can penetrate under the shoulder surface 14.

The deformation on the groove flank 11 and the pressure onto or the separation from the outer peripheral surface 7 differ in dependence on the strength of the pressure load (fluid pressure P).

This deformation is reversible and decreases with decreasing pressure.

LIST OF REFERENCE NUMERALS 1 sealing ring
2 tensioning ring
3 groove
4 machine part
5 machine part
6 sealing surface
7 outer peripheral surface
8 groove bottom
9 contact line
10 contact line
11 groove flank
13 shoulder surface
14 shoulder surface
15 space
16 space
17 inclined surface
18 inclined surface
19 side surface
20 side surface
21 line of intersection
22 line of intersection
23 edge
24 edge
25 rear side
26 gap
27 direction of arrow
28 annular space
$d_1$ separation from the outer peripheral surface
$d_2$ separation from the outer peripheral surface

The invention claimed is:

1. A sealing arrangement comprising:
a first machine part (4) having a groove (3);
a second machine part (5) having an outer peripheral surface (7) opposite the groove (3) and spaced apart from the first machine part (4) by a gap (26);
a sealing ring (1) disposed in the groove adjacent the peripheral surface (7), the sealing ring (1) including a shaped section having a central sealing surface (6) parallel to the outer peripheral surface (7), the central sealing surface (6) merging on both sides in steps into two shoulder surfaces (13, 14), the shoulder surfaces (13, 14) intersecting inclined surfaces (17, 18) at edges (23, 24), both edges being in a spaced apart relationship with the outer peripheral surface (7) and both shoulder surfaces (13, 14) being parallel to the outer peripheral surface (7) the shoulder surfaces (13, 14) each being connected to side surfaces (19, 20) of the sealing ring (1) via the inclined surfaces (17, 18) which extend transversely to the outer peripheral surface (7), whereby the inclined surfaces (17, 18) intersect the side surfaces (19, 20) at further edges (21, 22); wherein the sealing ring (1) has a substantially trapezoidal cross-sectional shape, wherein the rear side (25) of the sealing ring (1) is parallel to the outer peripheral surface (7), and sealing ring side surfaces (19, 20) are disposed at an angle to groove flanks (11); the angle relationship of the side surfaces (19, 20) to the groove flank (11) enabling pivoting of the sealing ring (1) about the central sealing surface (6) thereby enabling sealing contact being the edge (23) and the peripheral surface (7) with an annular space (28) between the sealing contact and the central sealing surface (6) and simultaneous full contact between the side surfaces (19, 20) and the groove flanks (11), the annulus space (28) defining spaced apart seals between the sealing ring and the peripheral surface (7); and
a tensioning ring (2) disposed in the groove (3) against a rear side (25) of the sealing ring (1).

* * * * *